United States Patent
Ouyang et al.

(10) Patent No.: US 11,002,638 B2
(45) Date of Patent: May 11, 2021

(54) MULTI-ZONE AUTOMATIC MAGNETOSCOP INSPECTION SYSTEM

(71) Applicant: United Technologies Corporation, Farmington, CT (US)

(72) Inventors: Zhong Ouyang, Glastonbury, CT (US); Andrew DeBiccari, North Branford, CT (US); William J. Brindley, Hebron, CT (US); Xuan Liu, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 96 days.

(21) Appl. No.: 16/361,303

(22) Filed: Mar. 22, 2019

(65) Prior Publication Data

US 2020/0300731 A1    Sep. 24, 2020

(51) Int. Cl.
*G01M 15/14*  (2006.01)
*G01N 23/046* (2018.01)
*G01N 27/82*  (2006.01)

(52) U.S. Cl.
CPC .......... *G01M 15/14* (2013.01); *G01N 23/046* (2013.01); *G01N 27/82* (2013.01); *G01N 2223/304* (2013.01); *G01N 2223/305* (2013.01)

(58) Field of Classification Search
CPC ...... G01N 23/046; G01N 27/82; G01M 15/14
See application file for complete search history.

(56) References Cited

U.S. PATENT DOCUMENTS

| 6,153,889 | A  | * | 11/2000 | Jones ............... G01N 25/72 |
|           |    |   |         | 250/559.45 |
| 7,146,990 | B1 |   | 12/2006 | Ngo et al. |
| 2006/0093480 | A1 |   | 5/2006 | Cunha et al. |

(Continued)

FOREIGN PATENT DOCUMENTS

| DE | 102004030501 A1 | 1/2006 |
| EP | 3346265 A1 | 7/2018 |
| GB | 1534968 A | 12/1978 |

OTHER PUBLICATIONS

Foerster "MAGNETSCOP 1.069" XP055715100, Reutlingen, Jan. 1, 2014 <URL: https://www.fluxgate-magnetometer.com/de/assets/foerster/media/Downloads/Magnetoscop%201.069/1069_GB_EN_REV0114.pdf> [retrieved on Jul. 15, 2020] pp. 1-12.

(Continued)

*Primary Examiner* — Reena Aurora
(74) *Attorney, Agent, or Firm* — Cantor Colburn LLP (57) ABSTRACT

A magnetoscop inspection system includes a magnetoscop, a computed tomography unit, and a corrosion model unit. The magnetoscop measures a permeability at a plurality of inspection points of a turbine component. The computed tomography unit generates a measured profile of a hollowed portion of the turbine component based at least in part on the permeability at the measured inspection points. The corrosion model unit stores in memory at least one reference computed tomography profile of a known turbine component. The magnetoscop inspection system determines a structural integrity of the turbine component based on a comparison between the measured profile and the reference profile corresponding to the turbine component currently under inspection.

18 Claims, 5 Drawing Sheets

(56) References Cited

U.S. PATENT DOCUMENTS

2018/0217097 A1    8/2018  Tada et al.
2019/0178087 A1*  6/2019  Meier ................... F01D 5/147

OTHER PUBLICATIONS

Foerster "MAGNETSCOP 1.070" XP055715098, Reutlingen, Mar. 7, 2019 <URL: https://www.fluxgate-magnetometer.com/de/assets/foerster/media/Downloads/Magnetoscop%201.070/1070_PI_EN_MAGNETOSCOP.pdf> [retrieved on Jul. 15, 2020] pp. 1-12.
European Search Report for European Application No. 20161665.3; Application Filing Date Mar. 6, 2020; dated Jul. 24, 2020 (12 pages).

* cited by examiner

MULTI-ZONE AUTOMATIC MAGNETOSCOP INSPECTION SYSTEM

BACKGROUND

Embodiments of the present disclosure are related generally to an apparatus and method for inspecting a component of a gas turbine engine, and more specifically, to techniques for inspecting turbine airfoils included in a gas turbine engine.

Gas turbine engines employed on an aircraft vehicle include a variety of internal components or airfoil components such as, for example, turbine blades and turbine vanes. The turbine blades and vanes can include internal cooling passages, which are frequently exposed to hot temperature environments that can contain rich oxygen levels and moisture. Continuous exposure to these environmental conditions can lead to corrosion of the internal walls of the cooling passages. This internal passage corrosion decreases the thickness of non-corroded wall portions and reduces the overall integrity of blades and/or vanes.

BRIEF DESCRIPTION

According to a non-limiting embodiment, a magnetoscop inspection system comprises a magnetoscop, a computed tomography (CT) unit, and a corrosion model unit. The magnetoscop is configured to measure a permeability at a plurality of inspection points of a turbine component. The CT unit is configured to generate a measured profile of a hollowed portion of the turbine component based at least in part on the permeability at the measured inspection points. The corrosion model unit is configured to store in memory at least one reference CT profile corresponding to a given known turbine component. The magnetoscop inspection system determines a structural integrity of the turbine component based on a comparison between the measured profile and a reference CT profile corresponding to the turbine component.

According to another non-limiting embodiment, a method is provided to inspect a turbine blade included in a gas turbine engine. The method comprises storing, via a corrosion model unit, at least one reference CT profile corresponding to a given known turbine component, and measuring, via a magnetoscop, a permeability at a plurality of inspection points of the turbine component. The method further comprises generating, via a computed tomography (CT) unit, a measured profile of a hollowed portion of the turbine component based at least in part on the permeability at the measured inspection points. The method further comprises determining a structural integrity of the turbine component based on a comparison between the measured profile and a reference CT profile corresponding to the turbine component.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the figures.

Turbine blades and/or vanes employed in gas turbine engines typically include various materials (e.g., nickel) susceptible to corrosion. The internal corrosion of turbine blades and/or vanes, can cause depletion of pure nickel (Ni) from a base metal alloy, and in turn can causes the deposition of corrosion byproducts such nickel oxide (NiO), cobalt oxide (CoO), etc., on the internal wall(s) of the corroding component.

Corrosion byproducts (e.g., NiO, CoO, etc.) typically have ferromagnetic properties, which can be sensed by magnetoscop devices. Therefore, a computer generated image of the component's internal profile can be produced using various computed tomography (CT) techniques. For example, magnetoscops are capable of measuring the magnetic flux density and relative permeability within the scope of the quality control of stainless steel and low-permeable (non-magnetic) alloys as well as the localization of ferrite enclosures. Magnetoscops can also detect changes in material (sulfidation, degradation of lamination, structural changes) based on permeability comparative measurements. However, the internal turbine internal components (e.g., blades and vanes) have complex geometries and profiles. Turbine blades, for example, have an airfoil profile that includes both convex portions and concave portions. Consequently, attempts to inspect the internal wall of a turbine blade using only a magnetoscop can result in inaccurate measurements due to separations or boundaries between the concave portions and convex portions.

Various non-limiting embodiments described herein provide a magnetoscop inspection system that includes a robotically controlled magnetoscop and a profile boundary controller. The robotically controlled magnetoscop includes a probe capable of scanning a turbine component (e.g., turbine blade) to detect a plurality of inspection points that define the inner-wall profile. The profile boundary controller analyzes the inspection points in combination with a physics-based model to determine different inner-wall profiles (e.g., concave profiles versus convex profiles) of a turbine engine component (e.g., a turbine blade), along with detecting boundaries between the different inner-wall profiles. In at least one non-limiting embodiment, the profile boundary controller analyzes neighborhood inspection points corresponding to a corroded portion(s) of the inner-wall, along with the CT wall thickness reading to calculate not only the thickness of the corrosion layer but also thicknesses of remaining non-corroded portions of the inner-wall With reference now to FIG. 1, a gas turbine engine 20 is schematically illustrated according to a non-limiting embodiment. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

Figure 1:
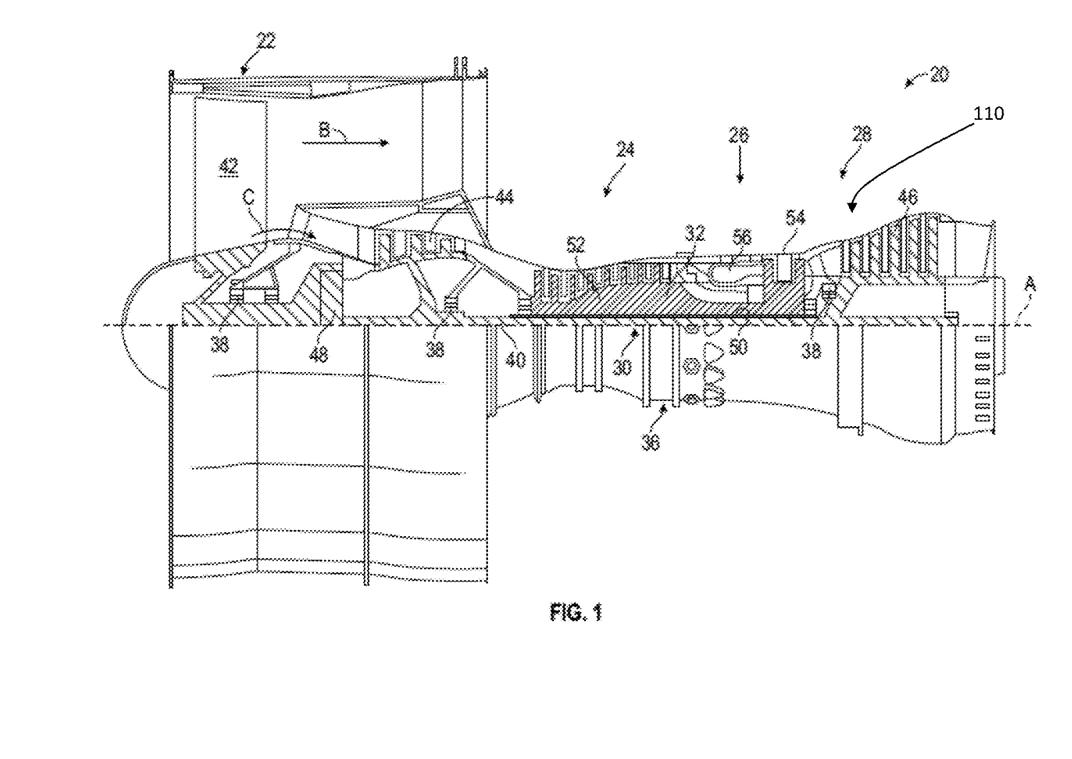
FIG. 1 is a partial cross-sectional view of a gas turbine engine.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis (A) which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figures 2, 3:
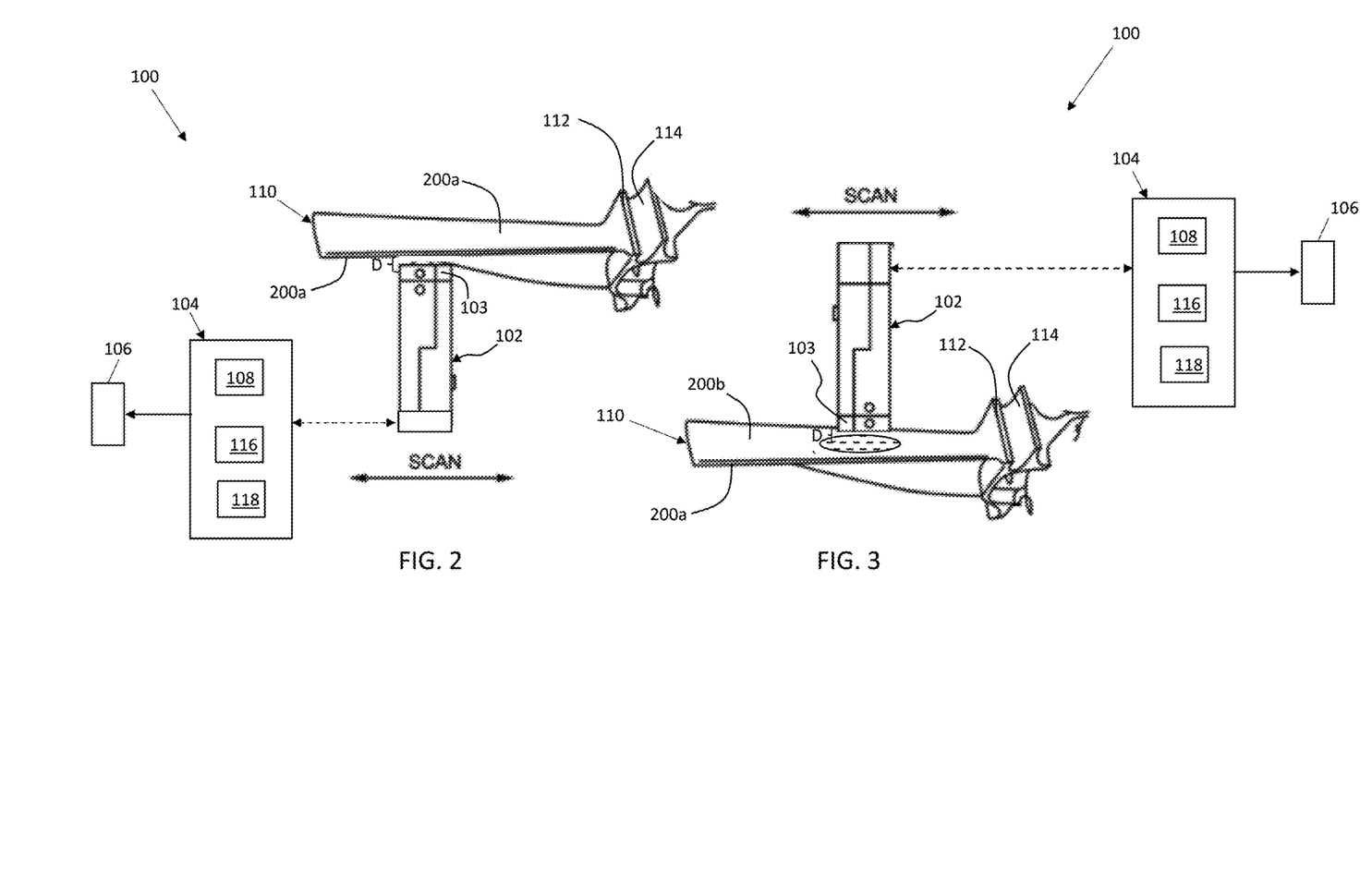
FIG. 2 illustrates a magnetoscop scanning a first surface of a turbine blade according to a non-limiting embodiment.
FIG. 3 illustrates a magnetoscop scanning an opposing surface of the turbine blade illustrated in FIG. 2.

Turning to FIGS. 2 and 3, a magnetoscop scanning inspection system 100 configured to inspect internal corrosion of a turbine blade 110 is illustrated according to a non-limiting embodiment. The turbine blade 110 includes a distal end 112, which is coupled to a rotor 114 of a turbine engine. Although a turbine blade 110 is illustrated as an example, the magnetoscop inspection system 100 is capable of scanning other turbine engine components or airfoil components such as, for example, a turbine vane.

Figure 4:
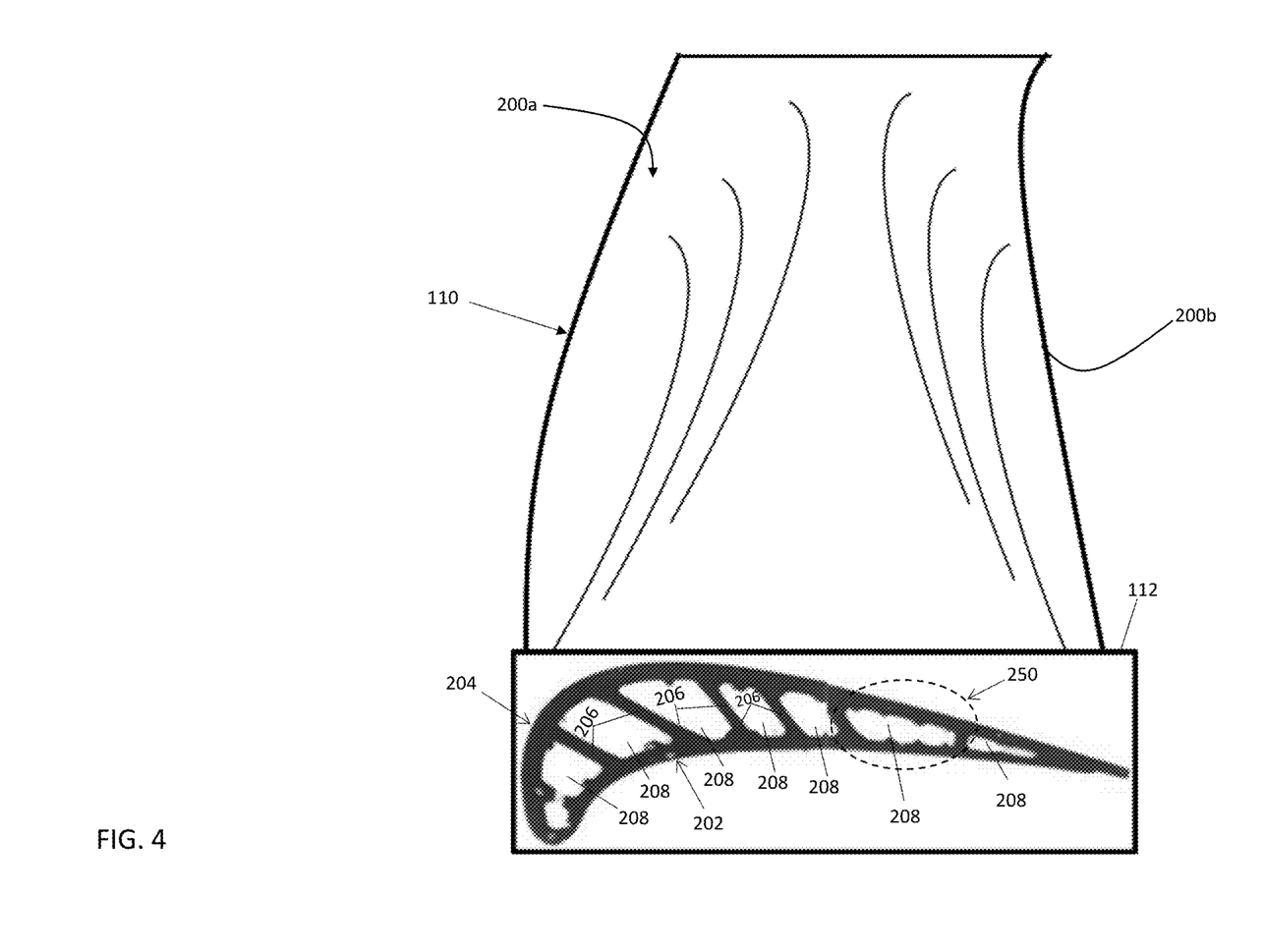
FIG. 4 illustrates a cross-section of the turbine blade shown in FIG. 3 according to a non-limiting embodiment.

A cross-section of the turbine blade 110 is illustrated in FIG. 4. The turbine blade 110 includes hollow cooling passages 208 defined by a pressure-side wall 202 and a suction-side wall 204. The cooling passages 208 pass cool air therethrough as the pressure-side wall 202 and the suction-side wall 204 are exposed to heated core gas flow. A plurality of ribs 206 extend between the pressure-side wall 202 and the suction-side wall 204 to define each individual internal cooling passage 208.

Figure 5:
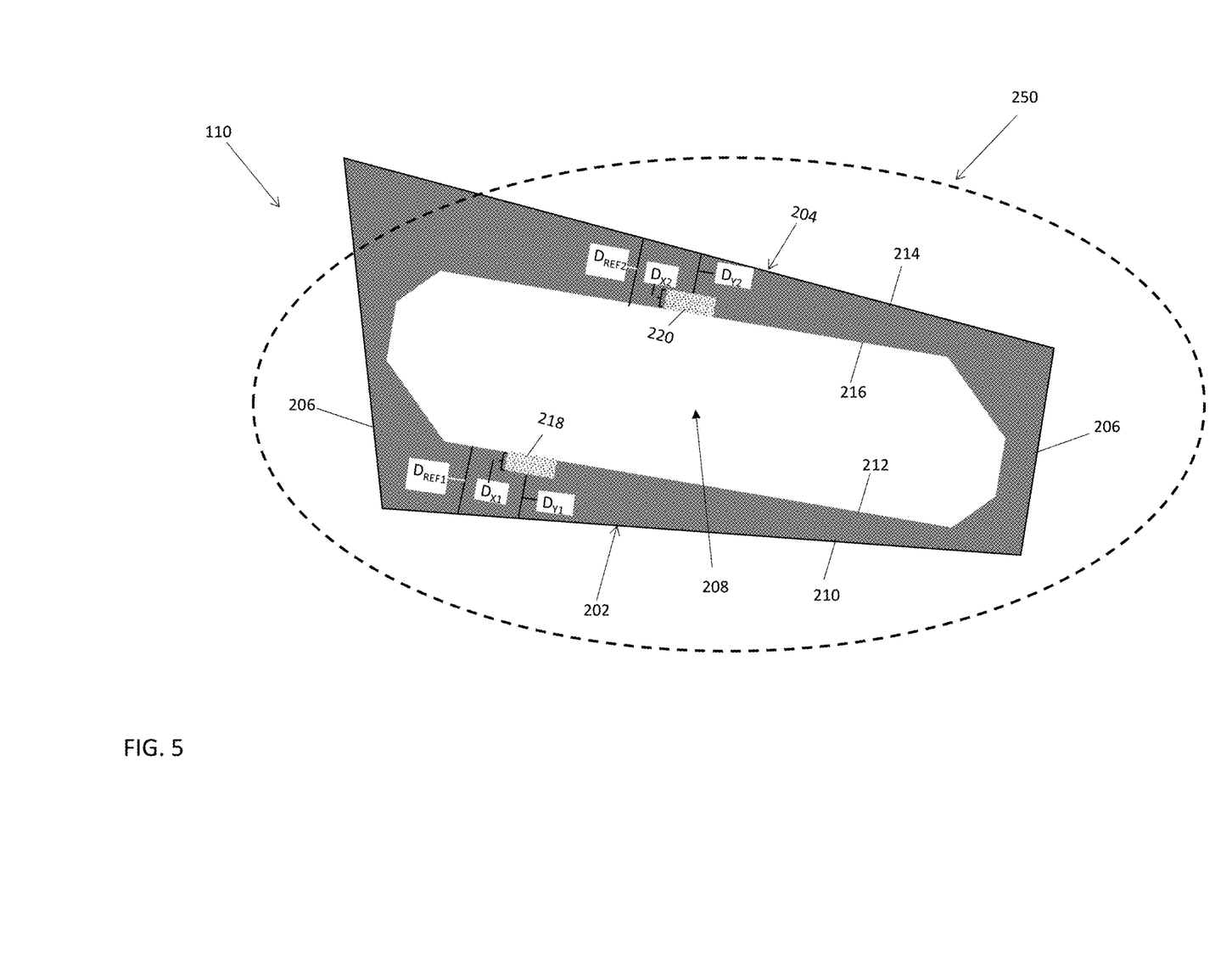
FIG. 5 is a close-up view of a measured profile of an internal section of the turbine blade including a cooling passage according to a non-limiting embodiment.

FIG. 5 is a close-up view of an internal section 250 of the turbine blade 110 including one of the cooling passages 208. The internal cooling passages 208 is bounded by an opposing pair of ribs 206, each which extends between the pressure-side wall 202 and the suction-side wall 204. The pressure-side wall 202 includes an outer pressure-side wall surface 210 and an inner pressure-side wall surface 212. Similarly, the suction-side wall 204 includes an outer suction-side wall surface 214 and an inner suction-side wall surface 216. The pressure-side wall 202 has a first corroded element 218 formed thereon, while the suction-side wall 204 has a second corroded element 220 formed thereon. These corroded elements 218 and 220 have ferromagnetic properties, which can be detected and analyzed by the magnetoscop scanning inspection system 100.

Referencing again FIGS. 2 and 3, the magnetoscop scanning inspection system 100 includes a magnetoscop 102, a magnetoscop controller 104, and a graphic user interface (GUI) 106. The magnetoscop 102 is configured to scan a pressure-side surface 200a of the turbine blade 110 (see FIG. 2) and an opposing suction-side surface 200b of the turbine blade 110 (see FIG. 3). The magnetoscop 102 can be supported by a one or more robotically controlled mechanisms (not shown). The GUI 106 can display measurements, images, and/or analyzed results obtained from inspecting a turbine component. The GUI 106 can also receive various inputs, models, and/or commands for controlling the magnetoscop 102.

The magnetoscop controller 104 can include a robotic control unit 108 that controls the operation of the robotic support mechanisms to facilitate autonomous scanning of the turbine blade 110. The robotic control unit 108 is also configured to actively adjust a position the magnetoscop 102 at a controlled orientation relative to the turbine blade 110 such that probe 103 is maintained at a set distance (D) away from the pressure-side surface 200a and the suction-side surface 200b. In this manner, the probe 103 can be prevented from scrapping directly against the surfaces 200a, 200b of the turbine blade 110, which in turn prevents damaging the probe 103 and scraping the turbine blade 110.

In at least one non-limiting embodiment, the magnetoscop inspection system 100 can inspect and analyze the permeability from the perspective of the pressure-side surface 200a and the suction-side surface 200b of the turbine blade 110. The results (e.g., detected magnetic flux permeability) can be compared with a threshold value to determine a structural integrity of the turbine blade 110. If the structural integrity of the turbine blade 110 is compromised then the turbine blade 110 may be overhauled or replaced. Accordingly, detecting permeability through the surfaces 200a, 200b can improve results of the inspection process.

The magnetoscop controller 104 further includes a CT unit 116 and corrosion model unit 118. Any one of the robotic control unit 108, the CT unit 116, and the corrosion model unit 118 can be constructed as an electronic hardware controller that includes memory and a processor configured to execute algorithms and computer-readable program instructions stored in the memory. In addition, the robotic control unit 108, the CT unit 116, and the corrosion model unit 118 can all be embedded or integrated in a single sub-controller.

While scanning the pressure-side and suction-side surfaces 200a, 200b of the turbine blade 110, the measured inspection points are fedback to the magnetoscop controller 104. Based at least in part on the permeability at the measured inspection points, the CT unit 116 generates a CT profile of the current state of the internal cooling passage 208. The current CT profile of the internal cooling passage 208 indicates the thicknesses of the pressure-side wall 202 and the suction-side wall 204 (see FIG. 5).

Figure 6:
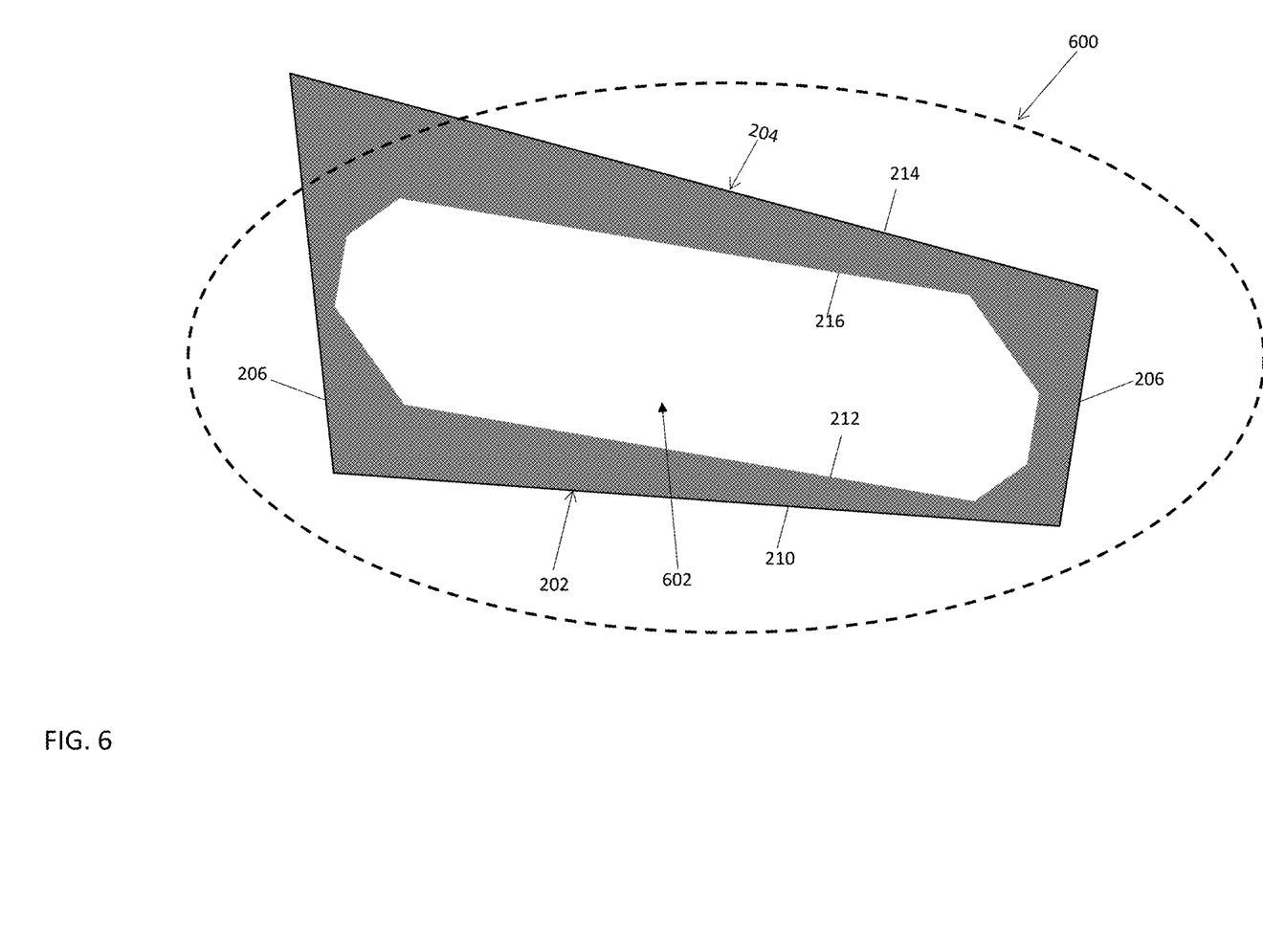
FIG. 6 illustrates a reference profile including an ideal cooling passage corresponding to the measured profile of the cooling passage shown in FIG. 5.

The corrosion model unit 118 can store one or more available reference CT profiles corresponding to a given known turbine component (e.g., turbine blade, turbine vane, etc.). FIG. 6 illustrates an example of a reference CT model 600 including an ideal cooling passage 602, which corresponds to the current measured CT profile 250 of the cooling passage 208 shown in the close-up section 250 illustrated in FIG. 5. Accordingly, the magnetoscop inspection system 100 can utilize the current measured CT profile 250 of the cooling passage 208 along with the corresponding reference CT reference profile 600 including the ideal cooling passage 602 to calculate the thickness of the corrosion elements 218, 220, along with the thickness of remaining non-corrosion portions ($D_{Y1}$, $D_{Y2}$) of the inner wall surfaces 212, 214 (see FIG. 5).

For example, a given turbine component, a particular instance (e.g., unique serial number) of the turbine component, or portion of the turbine component (e.g., an internal cooling passage of the turbine component) can be inspected prior to being made available for field operation, i.e., prior to being employed in a turbine engine for first time use. Accordingly, a reference CT profile 600 can be generated which indicates an expected or known profile of the internal cooling passage (i.e., an ideal cooling passage 602) of the given turbine component or the particular instance (e.g., unique serial number) of the turbine part, along with the expected or known thicknesses ($D_{REF1}$, $D_{REF2}$, $D_{REFn}$) of the pressure-side wall 202 and suction-side wall 204 prior to corrosion.

The corrosion model unit 118 can utilize a stored reference CT profile (e.g., reference CT profile 600) corresponding to the component currently scanned to accurately inspect and analyze the current profile of scanned component. In at least one embodiment, the corrosion model unit 118 can receive an input (e.g., component identification (ID)) via the GUI 106 indicating the type of turbine blade 110, particular instance (e.g., unique serial number) of the turbine component, etc., currently undergoing inspection. Based on the indicated turbine blade 110, the corrosion model unit 118 can obtain a corresponding reference CT profile from memory, and can compare the reference CT profile to the current measured CT profile generated from the measured inspection points that are fedback from the magnetoscop 102.

For example, the corrosion model unit 118 can obtain the reference CT profile 600 (see FIG. 6) corresponding to the current measured CT profile of the internal section 250 of the turbine blade 110 (see FIG. 5). Accordingly, the corrosion model unit 118 can calculate thicknesses of the remaining non-corroded portions of the pressure-side wall 202 and the suction-side wall 204. In this example, the thickness of the remaining non-corroded portions of the pressure-side wall 202 can be determined as distance ($D_{Y1}$) between the outer pressure-side wall surface 210 and the first corrosion element 218. Similarly the remaining non-corroded portions of the suction-side wall 204 can be determined as distance ($D_{Y2}$) between the outer suction-side wall surface 216 and the second corrosion element 220. The corrosion model unit 118 can also calculate the thickness ($D_{X1}$, $D_{X2}$) of the first and second corrosion elements 218 and 220, respectively.

In one or more embodiments, the thickness ($D_{Y1}$) of the remaining non-corroded portions (e.g., of the pressure-side wall 202) can be determined by subtracting the thickness of the adjacent corrosion element 218 from the known thickness (e.g., $D_{REF1}$) of the pressure-side wall 202, i.e., $D_{Y1}=D_{REF1}-D_{X1}$.

In one or more non-limiting embodiments, the magnetoscop scanning inspection system 100 can utilize the measured distances to determine the structural integrity of a turbine component, e.g., the turbine blade 110. For example, the corrosion model unit 118 can compare the thickness of the remaining non-corroded portions (e.g., $D_{Y1}$, $D_{Y2}$, etc.) to a distance threshold and/or can compare the corrosion element thicknesses ($D_{X1}$, $D_{X2}$, etc.) to a thickness threshold. When the wall thickness (e.g., $D_{Y1}$, $D_{Y2}$, etc.) and/or the corrosion element thickness ($D_{X1}$, $D_{X2}$, etc.) exceed their respective threshold, the corrosion model unit 118 can determine the component (e.g., turbine blade 110) is faulty, and generate an alert on the GUI 106. Accordingly, the component can be disposed of or destroyed to prevent it from being placed back into the field.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A magnetoscop inspection system comprises:
   a magnetoscop configured to measure a permeability at a plurality of inspection points of a turbine component;
   a computed tomography (CT) unit configured to generate a measured profile of a hollowed portion of the turbine component based at least in part on the permeability at the measured inspection points; and
   a corrosion model unit configured to store in memory at least one reference CT profile corresponding to a given known turbine component,
   wherein the magnetoscop inspection system determines a structural integrity of the turbine component based on a comparison between the measured profile and a reference CT profile corresponding to the turbine component,
   wherein the turbine component is a turbine blade, and the measured profile is a profile of an internal cooling passage contained in a hollowed portion of the turbine blade.

2. The magnetoscop inspection system of claim 1, wherein the measured profile further includes a measurement of a pressure-side wall and the suction-side wall, the pressure-side wall and the suction-side wall each including an outer wall surface and an inner wall surface.

3. The magnetoscop inspection system of claim 2, wherein the corrosion model unit is configured to determine one or both of a thickness of at least one corrosion element located in the internal cooling passage and a thickness of non-corroded wall portions of the turbine blade based at least in part on comparison between the measured profile and the reference CT profile.

4. The magnetoscop inspection system of claim 3, wherein the at least one corrosion element is formed on one or both of the pressure-side wall and the suction-side wall.

5. The magnetoscop inspection system of claim 4, wherein the thickness of non-corroded wall portions of the turbine blade is determined based at least in part on a first distance between the outer wall surface and the inner wall surface indicated by the reference CT profile, and a second distance between the outer wall surface and the at least one corroded element indicated in the measured profile.

6. The magnetoscop inspection system of claim 5, wherein the thickness of non-corroded wall portions of the turbine blade is calculated as a difference between the first distance and the second distance.

7. The magnetoscop inspection system of claim 1, further comprising a graphical user interface (GUI) configured to receive an input component identification (ID) indicating a type of the turbine component, wherein the corrosion model unit selects the reference CT profile from the at least one available reference CT profile stored in memory based on the input component ID.

8. The magnetoscop inspection system of claim 1, further comprising a robotic control unit configured to autonomously move the magnetoscop along at least one surface of the turbine component.

9. The magnetoscop inspection system of claim 8, wherein the robotic control unit is configured to actively adjust a position the magnetoscop at a controlled orientation relative to the turbine component such that the magnetoscop is maintained at a set distance away from the at least one surface.

10. A method of inspecting a turbine component, the method comprising:
    storing, via a corrosion model unit, at least one reference CT profile corresponding to a given known turbine component;
    measuring, via a magnetoscop, a permeability at a plurality of inspection points of the turbine component;
    generating, via a computed tomography (CT) unit, a measured profile of a hollowed portion of the turbine component based at least in part on the permeability at the measured inspection points; and
    determining a structural integrity of the turbine component based on a comparison between the measured profile and a reference CT profile corresponding to the turbine component,
    wherein the turbine component is a turbine blade, and the measured profile is a profile of an internal cooling passage contained in a hollowed portion of the turbine blade.

11. The method of claim 10, wherein generating the measured profile further includes generating a measurement of a pressure-side wall and the suction-side wall, the pressure-side wall and the suction-side wall each including an outer wall surface and an inner wall surface.

12. The method of claim 11, further comprising:
    performing a comparison between the measured profile and the reference CT profile; and
    determining one or both of a thickness of at least one corrosion element located in the internal cooling passage, and a thickness of non-corroded wall portions of the turbine blade based at least in part on the comparison.

13. The method of claim 12, wherein the at least one corrosion element is formed on the inner wall.

14. The method of claim 13, further comprising:
    determining a first distance between the outer wall surface and the inner wall surface indicated by the reference CT profile;
    determining a second distance between the outer wall surface and the at least one corroded element indicated in the measured profile; and
    determining the thickness of non-corroded wall portions of the turbine blade based at least in part on the first distance and the second distance.

15. The method of claim 14, further comprising determining the thickness of non-corroded wall portions of the turbine blade based on a difference between the first distance and the second distance.

16. The method of claim 10, further comprising:
inputting, via a graphical user interface (GUI), a component identification (ID) indicating a type of the turbine component; and
selecting, via the corrosion model unit, the reference CT profile from the at least one available reference CT profile stored in memory based on the input component ID.

17. The method of claim 16, further comprising autonomously moving, via a robotic control unit, the magnetoscop along at least one surface of the turbine component.

18. The method of claim 17, further comprising actively adjusting a position the magnetoscop at a controlled orientation relative to the turbine component such that the magnetoscop is maintained at a set distance away from the at least one surface.

* * * * *